United States Patent [19]

Degoulet et al.

[11] 4,368,486
[45] Jan. 11, 1983

[54] TELEVISION SYSTEM USING A MARKING CODE SUPERIMPOSED ON THE PICTURE

[75] Inventors: Gabriel Degoulet, Montfort; Gilbert Gaucher, Chateaugiron; Christian Gauthier, Acigne, all of France

[73] Assignees: Etablissement Public de Diffusion dit "Telediffusion de France", Montrouge; L'Etat Francais, represente par le Secretaire d'Etat aux Postes et Telecommunications (Centre National d'Etudes des Telecommunications), Issy les Moulineaux, both of France

[21] Appl. No.: 237,925

[22] Filed: Feb. 25, 1981

[30] Foreign Application Priority Data

Mar. 4, 1980 [FR] France .................................. 80 04810

[51] Int. Cl.³ .............................................. H04N 7/04
[52] U.S. Cl. .................................................. 358/146
[58] Field of Search ............... 358/142, 143, 214, 146, 358/147, 127, 183; 360/33

[56] References Cited

U.S. PATENT DOCUMENTS

| | | | |
|---|---|---|---|
| 3,737,566 | 6/1973 | Baer et al. | 358/93 |
| 3,885,217 | 5/1975 | Cintron | 455/39 |
| 4,051,532 | 9/1977 | Hilbert et al. | 358/142 |

OTHER PUBLICATIONS

Lawrence et al., "Addressing Method for Remote Television Receivers", *IBM Technical Disclosure Bulletin*, vol. 13, No. 11, Apr. 1971, p. 3239.

*Primary Examiner*—John C. Martin
*Attorney, Agent, or Firm*—Pearne, Gordon, Sessions, McCoy & Granger

[57] ABSTRACT

Television system using a marking code superimposed on a picture.

According to the invention, this code is constituted by a strip located in the right-hand part of the picture and formed by a periodic sequence of white and black areas constituting a clock and by a strip located in the left-hand part of the picture and formed by a sequence of white or black areas constituting the actual code. A decoder detects the presence of clock signals and compares the code received with stored codes.

6 Claims, 4 Drawing Figures

TELEVISION SYSTEM USING A MARKING CODE SUPERIMPOSED ON THE PICTURE

BACKGROUND OF THE INVENTION

The present invention relates to a television system using a marking code superimposed on the picture. It is used in the field of television.

New television services such as ANTIOPE(digital acquisition and televising of pictures organised into writing pages) or EPEOS (programmed recording of broadcasts on orders from sources) lead to the use of marks for making the performance of transmissions or broadcasts (e.g. start and finish of a programme).

Such marks are already used, for example in the form of "pellets" on telecine projector films or in the form of a "locating member" on cue or guide tracks of recording media.

These types of marks are difficult to use and cannot be readily adapted to the operating difficulties encountered in line broadcasting, such as breakdowns or direct transmission over running.

BRIEF SUMMARY OF THE INVENTION

The present invention relates to a television system provided with such marking means, but not having the aforementioned disadvantages. Moreover, the system of the invention is particularly well adapted to the aforementioned new services in that it makes it possible to characterize times in the broadcasting of data by the DIDON system (boadcasting of digital data) forming the basis for the performance of the aforementioned services.

More specifically, the present invention relates to a television system comprising a means for superimposing a marking code on one of the pictures to be televised and a decoder able to detect the presence of this code in the pictures, wherein the said marking code is formed by a first vertical strip constituted by a periodic sequence of alternately white and black areas, said strip being positioned along one of the lateral edges of the picture and by a second vertical strip constituted by a sequence of white or black areas, each extending over a height equal to the period of said sequence formed by the first strip, said second strip being located along the other lateral edge of the picture, the video signal corresponding to a picture having received such a code thus incorporating black or white signals located at the start and finish of a scanning line, and wherein the decoder comprises a circuit for detecting, in the video signal which it receives, the presence of white and black signals located at the start and finish of the line and for recognising, on the basis of the thus detected signals, the presence of said code and for transmitting a control order.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
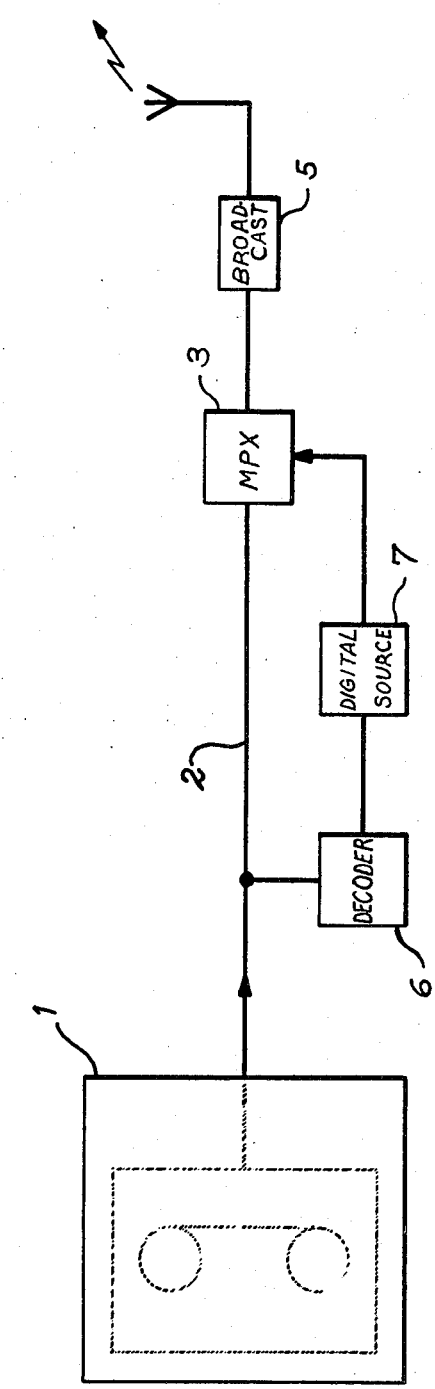
FIG. 1 a block diagram of a television installation according to the invention.

The installation shown in FIG. 1 comprises a video signal source 1 (e.g. a telecine) provided with means for superimposing a marking code, whose characteristics will be described hereinafter, on the picture to be broadcast. The video signal is transferred by a line 2 to a DIDON multiplexer 3, which supplies broadcasting members 5. The video signal is also applied to a decoder 6 able to recognise the code in question and supply a control order to a member 7, e.g. a digital data source, connected to the DIDON multiplexer.

The function of the coded picture is to accurately define a time at which a particular operation has to be started. This time, is for example, that of the start or finish of a film or that of introducing a subtitle by the ANTIOPE system or the transmission of an EPEOS signal, etc. The decoder is the member detecting the appearance of the code and makes it possible to control the start of the appropriate operation at the time in question.

Such means obviate the necessity of a person having to permanently monitor the programme for starting the transmission of the desired data, information or codes at the appropriate times.

Figure 2:
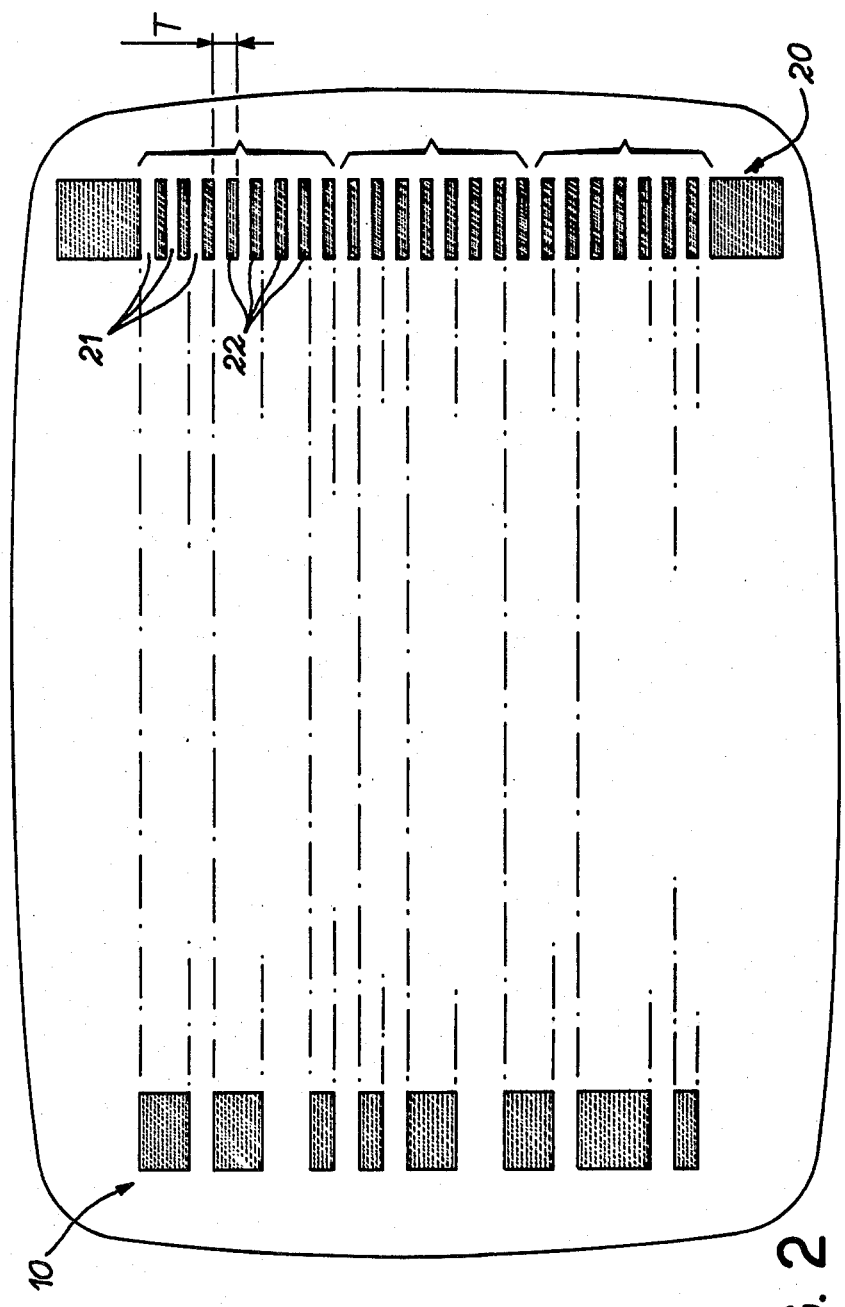
FIG. 2 the appearance of a picture containing a marking code according to the invention.

FIG. 2 shows a televised picture with its marking code according to the invention. The code is formed by two vertical strips 10, 20, the first being located in the left-hand part of the picture and the second in the right-hand part. The latter is constituted by a periodic sequence of white areas 21 and black areas 22, each area extending over a certain number of scanning lines (e.g. 10 lines). Two consecutive white and black areas define a "period" T. Such a signal which, by its periodicity represents a clock, preferably extends over a multiple of 8 periods and, for example, 24 periods (illustrated case) i.e. a total of $24 \times 20 = 240$ scanning lines in the present embodiment.

The left-hand strip 10 is also formed from white or black areas, each elementary earea corresponding in height to a clock period. Thus, such an area constitutes an information bit. In the illustrated case, the first two bits are black, the third bit is white, the next two are black, etc.

Preferably, and as for the clock signal, the left-hand area extends over a multiple of 8 bits (e.g. 24 bits) in such a way that the data signal is in the form of octets (3 in the present embodiment) these octets can advantageously be in accordance with the ASCII code (American Standard Code for Information Interchange). Thus, the marking code according to the invention contains both the actual marking data and the corresponding clock signal.

It should be noted that the central part of the picture is not affected by this code, which virtually reduces to zero the interference caused to the transmission of the programme. Moreover, as this code is only present on a single picture (i.e. on two consecutive frames) the viewer who has not been warned does not notice its appearance. The appearance of the picture is even less disturbed as a result of the fact that domestic television receivers generally have a scan which projects beyond the limits of the screen, in such a way that the two vertical strips 10 and 20 largely pass outside it.

For explanation purposes, the data and clock bands 10, 20 respectively can have a width corresponding to a scanning time of 3 microseconds. The start of the data signal can be approximately 10.5 microseconds from the leading edge of the line synchronization pulse and the start of the clock signal approximately 59 microseconds from said edge. The area occupied by the two bands then represents approximately 16% of the total picture.

Figure 3:
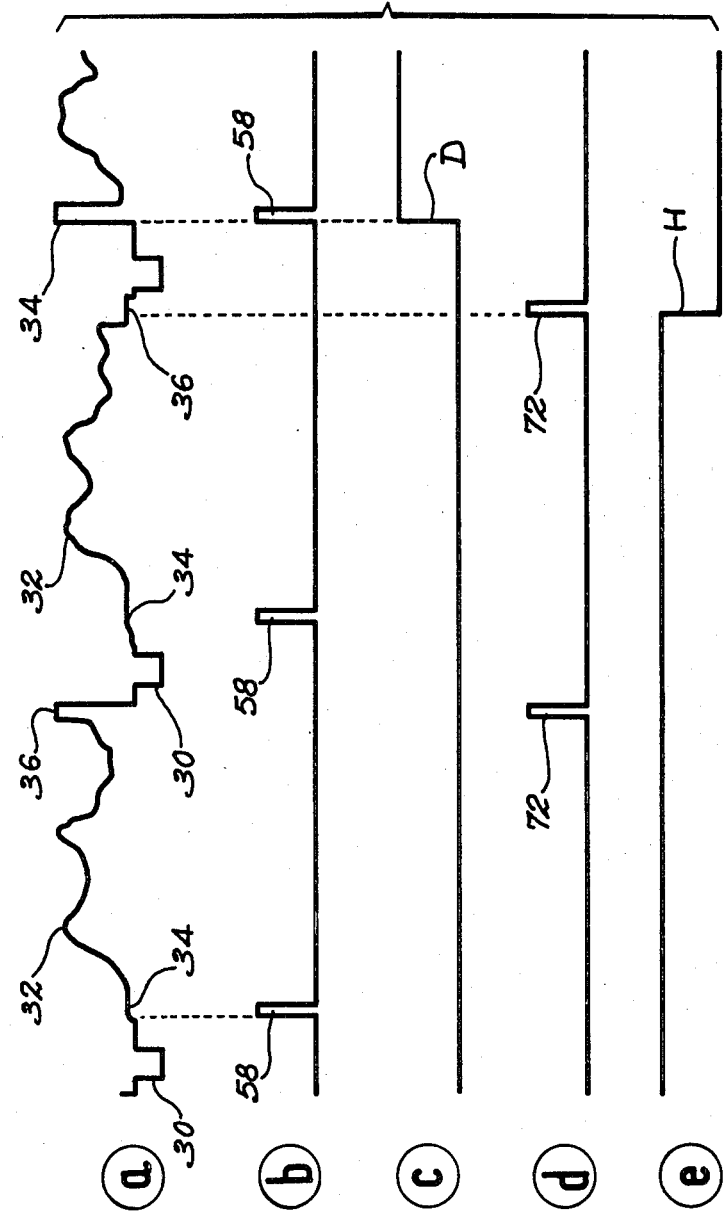
FIG. 3 the characteristic form of the video signal corresponding to this marking code, as well as the characteristic form of the sampling and storage signals used in decoding.

FIG. 3 shows in part a the characteristic form of a video signal making it possible to obtain a picture like that of FIG. 2. In this signal, it is possible to see line synchronization pulses 30 and luminence (or chrominance) signals 32. According to the invention, data signals 34 located at the start of the line and clock signals 36 at the end of the line are superimposed thereon. In the present embodiment, the first two data signals are at low level (corresponding to black) and the third is at high level (corresponding to white). There is therefore a transition from zero to 1 with the convention black=-white, white=1. The clock signal is firstly at high level (corresponding to white) then passes to low level (corresponding to black). Thus, there is a transition from 1 to zero with the same convention.

Lines b and c of FIG. 3 will be described hereinafter relative to the decoding circuit.

The means for inserting such signals into a television signal can either be electronic or call on an arrangement of corresponding pictures in films.

Electronic means can be of the video "tricking" means used in television control centres making it possible to substitute different information for portions of pictures by cutting out the original picture.

The following description refers more particularly to decoding means placed upstream of the data sources and which have the function of detecting the presence of a given code in the televised picture received.

Figure 4:
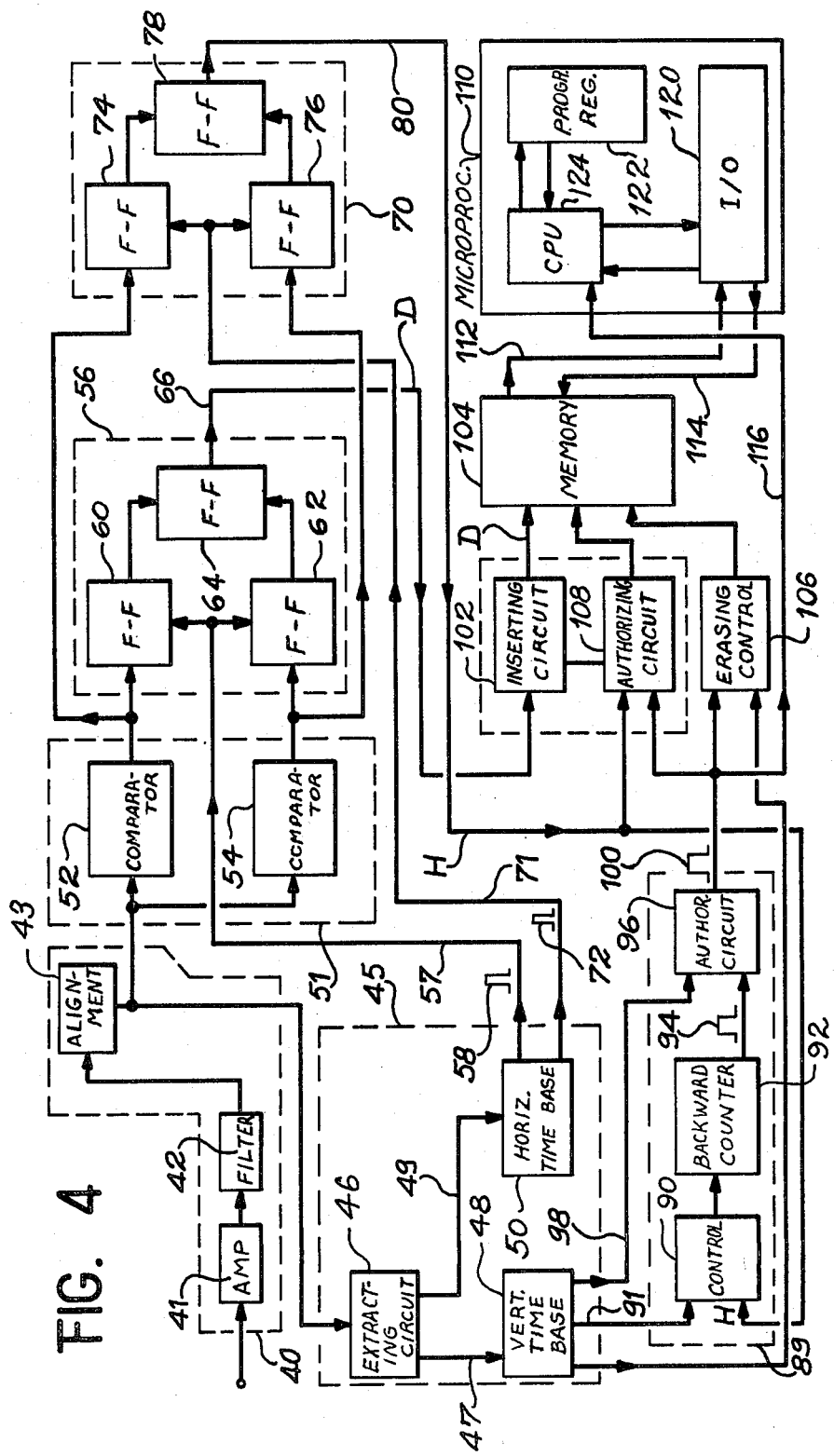
FIG. 4 the block diagram of a decoding circuit able to recognise the presence of a code in the video signal received.

These decoding means are shown synoptically in FIG. 4. They firstly comprise an input circuit 40 constituted by a video signal input E, a video amplifier 41, a low-pass filter 42 and an alignment 43. This circuit supplies a signal directed on the one hand to a circuit 45 and on the other to a comparison circuit 51.

Circuit 45 comprises:
- a circuit 46 for extracting the frame synchronization signals (supplied on a connection 47) and the line synchronization signals (supplied on a connection 49),
- a vertical time base 48 receiving the frame synchronization signals,
- a horizontal time base 50 receiving the line synchronization signals, said time base supplies on a connection 57 a data sampling pulse 58 corresponding to the start of the scanning lines and on a connection 57 to a clock sampling pulse 72 corresponding to the end of the lines.

The comparison circuit 51 comprises:
- a first comparator 52 able to detect a signal level corresponding to a black area,
- a second comparator 54 able to detect a signal level corresponding to a white area.

The comparison circuit is followed by:
- a first data sampling and storage circuit 56 formed by two flip-flops 60, 62 connected to comparators 52, 54 and controlled by pulse 58 carried by connection 57, and a third flip-flop 64 supplying a stored data signal D at an aoutput 66,
- a second clock sampling and storage circuit 70 constituted by two flip-flops 74, 76 connected to comparators 53, 54 and controlled by pulse 72 carried by connection 71 and by a third flip-flop 78 supplying a stored clock signal H at an output 80.

The decoding circuit of FIG. 4 also comprises a clock control circuit 89 constituted by:
- a circuit 90 for the control of signal H supplied by flip-flop 78, said circuit being controlled by the vertical time base 48 to which it is connected by a connection 91,
- a backward counter 92, whose initial content is equal, for example, to 24 and which supplies a pulse 94 when a complete clock signal (24 periods) is detected in a frame,
- an authorization circuit 96 receiving from the vertical time base 48 by a connection 98 a pulse corresponding to a given window and which supplies at its output a pulse 100 indicating the presence of a clock burst in said window.

The decoding circuit also comprises data processing means constituted by:
- a circuit 102 for inserting a service octet between two groups of data octets corresponding to two successive frames of a picture, said circuit receiving the stored data D supplied by flip-flop 64,
- a memory 104, e.g. of the FIFO type (First-In-First-Out) recording the two groups of data octets and the intercollated service octet,
- a circuit 106 controlling the erasure of said memory 104 at the end of each frame, said circuit being inhibited by pulse 100 from circuit 96,
- a circuit 108 for authorising the passage of stored clock signals H supplied by flip-flop 18,
- a microprocessor 110 connected to memory 104 by connections 112, 114 and to circuit 96 by connection 116, which supplies thereto pulse 100 indicating the presence of the clock burst, said microprocessor comprising an input-output circuit 120, a programme register 122 and a central processing unit 124.

The decoding circuit of FIG. 4 functions as follows. The video signal from the not shown picture source acts on the video amplifier 41, whose gain is e.g. equal to 2. It then passes across the lowpass filter 42, which attenuates all the frequencies above 3 MHz. Circuit 44 carries out a dynamic alignment of the signal by taking as the reference base the backgrounds of the synchronization signals.

Circuits 54 and 52 are comparators, whose output is at zero or 1, depending on the amplitude of the signal present at the output being equal to or in excess of a given reference, making it possible to determine the dark or bright parts of a picture.

Circuit 52 processes the signals corresponding to the dark parts, circuit 54 processes those corresponding to the bright parts. Circuit 46 receives the video signals and extracts it the synchronization signals, which it then separates into horizontal and vertical synchronization.

The horizontal time base 50 produces video signal sampling pulses 58, 72, which are necessary for the circuits 60 and 62 (for data) and 74 and 76 (for the clock). These pulses, whose phase must be very accurate with respect to the horizontal synchronization, are obtained by counting from a clock at 1 MHz controlled during horizontal synchronization by a per se known phase interlocking loop system.

The operation of these sampling and storage means is illustrated by lines b to e in FIG. 3. The data sampling pulses 58 appear on line b. These pulses are located at the start of the line immediately following the line synchronization pulse. Flip-flops 60, 62 store the state of the data signal during a line and flip-flop 64 transmits a voltage square-wave at its output 66 when there is a transition from 0 to 1 on the data signal (signal of line c).

The clock signal sampling pulses 72 appear on line d. They are located at the end of the line. Flip-flops 74, 76 also store the state of the clock signal during one line and flip-flop 78 supplies at its output 80 a voltage square-wave when there is a transition from 1 to zero in the clock signal (line e).

Thus, the assembly of circuits 60, 62, 64 and 74, 76, 78 constitutes sampling and storage devices, whose output only changes state during video signal passages from black to white and vice versa, the lowest amplitude transitions of the video signal being ignored.

On the basis of counters, the vertical time base 48 processes corresponding signals in the coded picture, at the start and finish of the clock burst. This makes it possible to eliminate all the signals recived outside said window.

Circuit 90 receives the clock signal H carried by connection 80 and only authorises its passage within the window in question.

By backward counting, circuit 92 checks that the number of clock periods in said window is correct. For this purpose, it is set to 24 at each frame start and if it counts 24 clock periods during the time authorised by 90, it supplies a pulse 94. This pulse is in turn authorised by circuit 96 if it occurs in a square time wave determined by 48.

Circuit 106 controls the erasure of the data stored in memory 104. This erasure takes place at the end of each frame, except when 106 receives from 96 pulse 100 indicating the presence of a presumed significant clock burst. In this case, the input data in memory 105 must be retained for processing.

Circuits 102, 108 insert a service octet between the two blocks of three octets corresponding to the two marking frames, said octets serving to resynchronize the decoding software used by microprocessor 110. It can be an octet in which all the bits are zero.

Memory 103 receives the data D in series from circuit 56. It is read when microprocessor 110 receives via connection 106 pulse 100 indicating the presence of a clock burst which is assumed to be good.

Microprocessor 110 measures the duration of pulse 100. If it is not in accordance with a value entered in the programme, the assembly is brought into the wait position. Thus, independence is attained of any spurious pulses. If conformity exists, the transfer of data from memory 102 to microprocessor 110 starts, timed by a dialogue between the two members using connections 112 and 114.

As stated hereinbefore, the information inscribed on the coded picture can form a group of three octets representing three alphanumeric characters according to the ASCII code. For example, these three characters can be the three letters D, E, B indicating the start of a broadcast, or the three letters F, I, N indicating the end of the broadcast. In other examples, the three characters can be D, 1, 2 or F, 1, 2 for marking the start and finish of a programme carrying number 12.

The programme register 122 contains the codes corresponding to the different groups of three characters which can appear on a coded picture and in the first example they consist of the two groups D, E, B and F, I, N.

When an octet representing a character is transferred into microprocessor 110 by connection 112 the programme compared it with the first character of the first group entered in the programme register 122, then with the second character if the result of the first comparison is negative. If the second comparison is negative, the programme awaits the service octet in order to then test the second group of three octets. If the comparison is positive, the programme is continued by the transfer, followed by the comparison of the second octet and then the third octet contained in memory 102.

When three consecutive characters of the same group have been "recognised" in the same way, the microprocessor 110 supplies a significant signal. For example, it can consist of a jump in the programme for producing a particular code of the EPEOS system.

What is claimed is:

1. A television system comprising a means for superimposing a marking code on one of the pictures to be televised and a decoder able to detect the presence of this code in the pictures, wherein the said marking code is formed by a first vertical strip constituted by a periodic sequence of alternately white and black areas, said strip being positioned along one of the lateral edges of the picture and by a second vertical strip constituted by a sequence of white or black areas, each extending over a height equal to the period of said sequence formed by the first strip, said second strip being located along the other lateral edge of the picture, the video signal corresponding to a picture having received such a code thus incorporating black or white signals located at the start and finish of a scanning line, and wherein the decoder comprises a circuit for detecting, in the video signal which it receives, the presence of white and black signals located at the start and finish of the line and for recognising, on the basis of the thus detected signals, the presence of said code and for transmitting a control order.

2. A system according to claim 1, wherein the decoder comprises means for detecting the presence of a signal corresponding to the first periodic strip and for authorising the operation of the means for the recognition of the signal corresponding to the second strip.

3. A system according to claim 1, wherein the clock signal forming the right-hand strip on the picture comprises groups of eight periods and wherein the data signal forming the left-hand strip comprises the same number of octets representing the alphanumeric characters according to the ASCII code.

4. A system according to claim 3, wherein the means for extracting the signals from the code of the video signal received comprise:
 a circuit for extracting frame and line synchronization signals from the video signal received,
 a vertical time base controlled by the frame synchronization signals,
 a horizontal time base controlled by the line synchronization signals, said time base transmitting pulses at the start and finish of the line,
 a sampling and storage circuit for the data signals controlled by the pulses of the horizontal time base,
 a sampling and storage circuit of the clock signals controlled by the pulses of the horizontal time base.

5. A system according to claim 4, wherein the means for detecting the presence of a signal corresponding to the first periodic strip comprise:
- a circuit controlling that the signal supplied by the second circuit drops in a window defined by the time base,
- a backward counter connected to the circuit and supplying a pulse indicating the presence of a correct number of clock pulses,
- an authorization circuit controlled by the vertical time base.

6. A system according to claim 5, wherein the means for recognising the presence of a signal corresponding to the second strip comprise:
- a said circuit for inserting a service octet between two groups of data octets corresponding to two successive frames of the coded image,
- a memory recording the two groups of data octets and the service octet,
- a circuit for controlling the erasure of the memory at the end of each frame, said circuit being inhibited by the pulse from the authorization circuit,
- a microprocessor connected to the memory, said microprocessor incorporating an input-output circuit, a programme register and a central processing unit, said microprocessor being able to carry out comparisons between each octet read into the memory and the predetermined octets.

* * * * *